United States Patent
Hart et al.

(10) Patent No.: US 8,965,462 B2
(45) Date of Patent: Feb. 24, 2015

(54) PERSISTENT DISPLAY OF PRIORITY INFORMATION ON A PORTABLE ELECTRONIC DEVICE

(75) Inventors: Brian W. Hart, Austin, TX (US); Liang Jiang, Austin, TX (US); Anil Kalavakolanu, Austin, TX (US); Minh M. Pham, Austin, TX (US); Stephen A. Schlachter, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 186 days.

(21) Appl. No.: 13/557,741

(22) Filed: Jul. 25, 2012

(65) Prior Publication Data

US 2014/0031090 A1 Jan. 30, 2014

(51) Int. Cl.
*H04B 1/38* (2006.01)

(52) U.S. Cl.
USPC ........ 455/574; 455/566; 455/572; 455/343.5; 455/343.6; 455/550.1

(58) Field of Classification Search
CPC .................................................. H04W 88/02
USPC ........ 455/572, 343.1–343.6, 436, 552.1, 571, 455/573, 574, 406, 550.2; 345/901, 211, 345/97, 204, 85, 107, 156, 87, 1.1; 320/120, 128, 132, 133, 134
See application file for complete search history.

(56) References Cited

U.S. PATENT DOCUMENTS

| | | | |
|---|---|---|---|
| 6,232,937 B1 | 5/2001 | Jacobsen et al. | |
| 7,800,715 B2 | 9/2010 | Nishino et al. | |
| 2007/0091080 A1 | 4/2007 | Ek et al. | |
| 2008/0057894 A1* | 3/2008 | Aleksic et al. | 455/187.1 |
| 2008/0146285 A1 | 6/2008 | Lee et al. | |
| 2009/0104936 A1 | 4/2009 | Lapstun et al. | |
| 2009/0117953 A1 | 5/2009 | Oh | |
| 2010/0003950 A1* | 1/2010 | Ray et al. | 455/404.1 |
| 2010/0240402 A1 | 9/2010 | Wickman et al. | |
| 2010/0315248 A1 | 12/2010 | Townsend et al. | |
| 2012/0154465 A1 | 6/2012 | Kudo et al. | |

* cited by examiner

*Primary Examiner* — Babar Sarwar
(74) *Attorney, Agent, or Firm* — Patrick J. Daugherty; Driggs, Hogg, Daugherty & Del Zoppo Co., LPA (57) ABSTRACT

Personal digital assistant devices are provided that query power subsystems to determine a level of battery power currently available for operating processes, and further determine a number of screen display changes that may be effected on a persistent display device at that determined level. If the determined number of screen display changes that may be effected at the determined level of available battery power fails to meet a specified minimum threshold number of images, the processing unit powers down subsystems of the personal digital assistant device and causes a highest listed image of a prioritized list of screen image instances to be displayed on the persistent display device, which persistently displays the image after a loss of power.

20 Claims, 2 Drawing Sheets

PERSISTENT DISPLAY OF PRIORITY INFORMATION ON A PORTABLE ELECTRONIC DEVICE

FIELD OF THE INVENTION

Embodiments of the present invention relate to selecting and persistently displaying priority data on programmable personal digital assistant devices in response to low power determinations.

BACKGROUND

Smart cellular phones and other mobile, programmable Personal Digital Assistant devices (PDA's) are frequently used to display a variety of important information on powered display screens. Illustrative but not exhaustive examples include airline boarding passes and other mass transit tickets, concert and other entertainment venue admission tickets, medical appointment addresses and times and dates, to-do lists, contact information, etc. However, such information will not be available if the device is out of power and unable to power or refresh the display screens with the desired information. Accordingly, if a PDA loses power to the point that the device shuts down, a user will not be able to display the needed information to prove authority to enter a restricted airport area or board a plane, complete a transaction, get to a meeting, etc.

BRIEF SUMMARY

In one embodiment of the present invention, a method for displaying a prioritized item on a persistent display in response to a low-power determination includes a processing unit of a programmable personal digital assistant device populating a prioritized data list of screen image instances that are listed in an order prioritized as a function of inputs from a user list of items, clock data associated with the user list of items, and calendar data associated with the user list of items. The processing unit queries a power subsystem of the personal digital assistant device to determine a level of battery power currently available for operating processes of the personal digital assistant device, and determines a number of screen display changes that may be effected on a persistent display device in communication with the personal digital assistant device at that determined level. If the determined number of screen display changes that may be effected on the persistent display device at the determined level of available battery power is not more than a specified minimum threshold number of images, the processing unit powers down a subsystem of the personal digital assistant device to conserve battery power and automatically causes a highest prioritized image of the prioritized data list to be displayed on the persistent display device, wherein the persistent display device persistently displays the highest prioritized image (or any currently displayed image) after a loss of power.

In another embodiment, a personal digital assistant device system has a processing unit, computer readable memory and a tangible computer-readable storage device with program instructions, wherein the processing unit, when executing the stored program instructions, populates a prioritized data list of screen image instances that are listed in an order prioritized as a function of inputs from a user list of items, clock data associated with the user list of items, and calendar data associated with the user list of items. The processing unit queries a power subsystem of the personal digital assistant device to determine a level of battery power currently available for operating processes of the personal digital assistant device, and determines a number of screen display changes that may be effected on a persistent display device in communication with the personal digital assistant device at that determined level. If the determined number of screen display changes that may be effected on the persistent display device at the determined level of available battery power is not more than a specified minimum threshold number of images, the processing unit powers down a subsystem of the personal digital assistant device to conserve battery power and automatically causes a highest prioritized image of the prioritized data list to be displayed on the persistent display device, wherein the persistent display device persistently displays the highest prioritized image (or any currently displayed image) after a loss of power.

In another embodiment, an article of manufacture has a tangible computer-readable storage device with computer readable program code embodied therewith, the computer readable program code comprising instructions that, when executed by a processing unit of a personal digital assistant device, cause the processing unit to populate a prioritized data list of screen image instances that are listed in an order prioritized as a function of inputs from a user list of items, clock data associated with the user list of items, and calendar data associated with the user list of items. The processing unit queries a power subsystem to determine a level of battery power currently available for operating processes of the personal digital assistant device, and determines a number of screen display changes that may be effected on a persistent display device in communication with the personal digital assistant device at that determined level. If the determined number of screen display changes that may be effected on the persistent display device at the determined level of available battery power is not more than a specified minimum threshold number of images, the processing unit powers down a subsystem of the personal digital assistant device to conserve battery power and automatically causes a highest prioritized image of the prioritized data list to be displayed on the persistent display device, wherein the persistent display device persistently displays the highest prioritized image (or any currently displayed image) after a loss of power.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Smart cellular phones and other mobile, programmable Personal Digital Assistant devices (PDA's) may display a wide variety of information on powered display screens. It is increasing common to use their displays to convey information that was historically printed onto paper or other permanent, fixed display media. This provides convenience to the user in eliminating the necessity to print and carry a variety of individual items, such as airline boarding passes, entertainment venue admission tickets, etc. Information may also be dynamically updated, for example enabling up-to-the-minute changes in flight numbers, departure times or gate assignment information in boarding passes, times and locations of appointments, or refreshing to-do lists to drop completed items and add new items.

However, PDA's are mobile devices that generally rely on internal batteries to provide operative power, including for drawing and refreshing items displayed on their powered screens. Generally, the display screens become blank and entirely fail to persistently display information once the battery power drops below a minimum operative threshold. Accordingly, if a PDA loses power to the point that the device or its display shuts down, a user will not be able to display the needed information to enter a restricted airport area, entertainment venue, etc.

Some PDA's may have a non-volatile persistent display device that continues to display information after power has been shut off. For example, unlike conventional backlit panel displays which emit light, electronic ink display technologies (sometimes referred to as electronic paper, or e-paper) reflect light, in some examples like ordinary paper. Electronic ink displays rely on reflected light to be legible (from lamps and other artificial lights, sunlight and ambient daylight, etc.) and may thus hold drawn or populated, readable static text and images indefinitely without using electricity. Accordingly, if they lose battery power to a point below an operative threshold requirement, they may continue to display the last displayed information. Once powered up again later, they may be changed or refreshed to update the information as needed. However, problems arise when the information currently displayed on an electronic ink display that has lost power is not the correct or needed information; perhaps a book page is displayed, but the user needs to switch the screen to a boarding pass display. If the device driving the screen display has shut down due to low power, the user will not be able to retrieve the other, desired information.

The prior art generally addresses these issues via power management methods and systems that conserve power; though useful, such options cannot enable a screen to redraw and change the displayed information once available power has dropped below minimum operative thresholds. Another possible solution is to make hard copies of the critical information, which defeats the convenience and purpose of using a PDA device to display such information in the first place. Other solutions include carrying spare batteries or powering devices, and transferring data between devices while they are still powered: each is generally cumbersome and undesirable.

Figure 1:
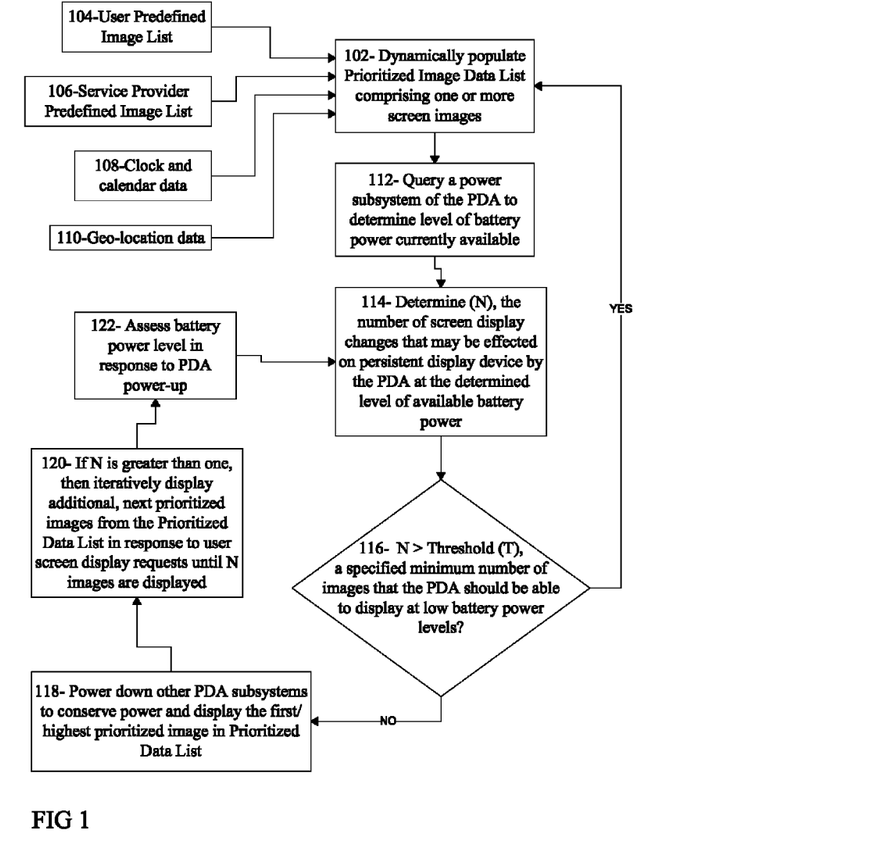
FIG. 1 is a block diagram illustration of an embodiment of a method, process or system according to the present invention for displaying one or more items from a prioritized list of data items on a persistent display in response to a low-power determination.

FIG. 1 illustrates an embodiment of the present invention for displaying one or more items from a prioritized list of data items on a persistent display in response to a low-power determination. At 102 a Prioritized Data List comprising one or more screen images is dynamically populated in a prioritized order as a function of inputs from a User Predefined List 104, clock and calendar data 108, and optionally from a Service Provider Predefined List 106 and geo-location data 110.

At 112 a power subsystem of the PDA is queried to determine the level of battery power currently available for PDA processes. At 114, the process determines a number (N) of screen display changes that may be effected on a persistent display device by the PDA at the determined level of available battery power.

The persistent display device is an electronic ink or other device that persistently displays a currently rendered image after loss of power. It may be the only, primary display screen of the PDA, or it may be another, secondary screen provided on the PDA in addition to a primary backlit or other non-persistent display (which does not display image information when power is lost). It may also be a component part of a combination display that provides both backlit and passive (reflected light) displays, depending on operative selection by the PDA.

At 116, N is compared to T, which is a threshold minimum number of images specified by a user, manufacturer or service provider that the PDA should be able to display to a user at low battery power levels (when not enough battery power remains available for continued general cellular and data use of the PDA). If N is greater than T, the process loops back to 102 for further dynamic Prioritized Image Data List updates, and for subsequent currently available battery level and N determinations at 112 and 114. If N is less than or equal to T, then at 118 the Prioritized Image Data List generated dynamically at 102 becomes static (the process does not loop back to 102), the PDA powers down other device subsystems to conserve power (for example, transitions to an "off" or "standby" mode), and the PDA causes the first/highest prioritized image in the Prioritized Data List to display on the persistent display device.

If N is greater than one, then at 120 the PDA may iteratively display additional, next prioritized images from the Prioritized Data List in response to user screen display requests until N images are displayed. The user may also toggle back to earlier screens of the N permitted screen displays, thus to a previously displayed, higher-prioritized and listed image, giving the user a limited (N) number of total screen changes. In one aspect, powering down the other device subsystems at 118 to a "standby" or "off" mode may comprises shutting down cellular or data communications with the PDA, but wherein the device remains responsive to user inputs at 120 to toggle up and down through N display changes.

At 122 the battery power level is assessed in response to a subsequent power-up of the PDA by the user (or other power-up prompt), for example after the PDA power system has been charged or refreshed by the user. The process then loops back to use this determined power level to determine the number (N) at 114, etc.

Figure 2:
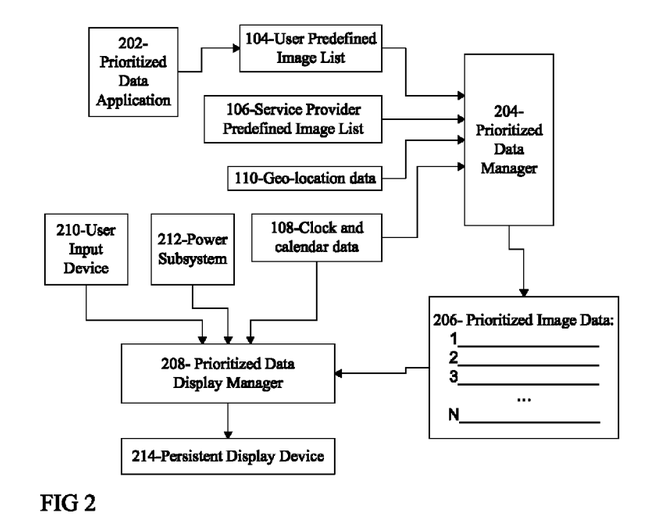
FIG. 2 is a block diagram illustration of a system or article embodiment of the present invention.

In one embodiment of the present invention illustrated in FIG. 2, a programmable PDA or other device executing program code functions as a Prioritized Data Application component 202 that populates entries in the User Predefined List (104, FIG. 1) by priority by designating one text or other data display image as a most/highest prioritized image, with any other items prioritized subsequently, based on user input designating or indicating the relative priorities of the listed items. For example, a user may designate a boarding pass image stored in a data location on the PDA as having the highest priority ($1^{st}$ item) image in the User Predefined list 104, and wherein a car rental reservation image is designated as a next in priority ($2^{nd}$ item).

A programmable PDA or other device executing program code also functions as a Prioritized Data Manager 204 that dynamically populates entries in the Prioritized Data List 206 (which is used at 102, FIG. 1) based on the prioritized User Predefined List 104, and also on queries of or inputs from the Service Provider Predefined List 106 (FIG. 1), the clock and calendar information 108 (FIG. 1) and the geo-location information 110 (FIG. 1).

A Prioritized Data Display manager 208 (which is a programmable PDA or other device executing program code) selects items from the populated Prioritized Data List 206 for display on a Persistent Display Device 214 as a function of inputs from a User Input Device 210, a Power Subsystem 212 and the Clock data 108. For example, the Prioritized Data Display manager 208 may select an item for display from the Prioritized Data List 206 by selecting or toggling between list items (as discussed with respect to 120, FIG. 1) responsive to user input through the User Input Device 210; query the Power Subsystem 212 periodically (pursuant to the clock data 108) to determine the level of battery power currently available (as discussed with respect to 112, FIG. 1), and thereby to perform the steps 114, 116, 118, 120 and 122 of FIG. 1.

In one example, the Prioritized Data Display Manager 208 queries the power subsystem (at 112, FIG. 1) to determine the amount or level of battery power available by determining a series of battery power values for the PDA associated with each of a plurality of different clock inputs 108 (for example, on a periodic basis). Differences between the determined battery power values are then compared as a function of time of acquisition of each value (from the clock data 108) to specified (or expected) power delta changes over time to calculate the number of display changes possible (N) at 114, FIG. 1). However, it will be understood by one skilled in the art that a variety of power level and N determinations may be practiced at 112 and 114. For example, the processes at 112 and 114 may comprises monitoring existing standard battery assessment processes performed by the PDA for reports of available percentages of a total power capacity of a fully-charged state of the battery that is supplying power to the PDA, and N and T may be associated with pre-selected percentage values specified by factory, service provider or user settings. Still other battery power assessment processes will be apparent to one skilled in the art.

Embodiments of the present invention may thus display the highest priority, sometimes critical data with respect to the needs of a user, on a non-volatile display that persists after power has been lost. By using Prioritized Data Lists 206, a set (or sets) of priority data instances may be displayed in a configurable sequence: for example, to progressively toggle from highest/most important through lesser important items until a threshold number (N) of items has been displayed. It will be understood that the Prioritized Data List 206 may comprise more than N items, but that only the highest N items may be toggled through, when it is estimated or determined (at 116, FIG. 1) that there is only enough power left for N final display updates. Thus, the Prioritized Data Display manager 208 may cause the Persistent Display Device 214 to display the first set of two boarding passes (prioritized in positions 1 and 2 of the Prioritized Data List 206) when there is power left for only two display updates (T=2), leaving enough power to display the second boarding pass when needed. It should be noted that each new display update triggered by a user generally counts toward the number (N) of items that may be displayed: thus, by triggering new screen updates, a user may give up the ability to re-display previously displayed images or remaining images in the Prioritized Data Lists 206. For example, if the Prioritized Data List 206 contains four images (A, B, C, and D) and the device contains enough power for four screen refreshes, then if the user displays the following sequence of four "A→B→C→B," the user will have "used up" all the available refreshes without ever reaching image D. The user may be notified that he is free to depart from a default order, but at a cost of giving up access to some of the images.

Embodiments allow a user to cycle/scroll through the Prioritized Data List 206 set of data instances on the display via a PDA input 210 such as a volume rocker or other PDA input device. In some embodiments, the Prioritized Data Display Manager 208 changes the meaning of a volume rocker or other PDA input device when the remaining power level comparison at 116 triggers the lower power processes of 118, 120 and 122, and in some examples also depending on the phone's orientation or device state. For example, the volume rocker may control PDA audio volume when the phone is upright, and instead toggle through list items on the persistent display 214 when the PDA display orientation is inverted relative to the user (determined through gravity sensors), and/or when power is low or the PDA is powered off.

The Prioritized Data List 206 allows for designation of one data instance as the highest priority (most important), and for automatic display when there's only enough power left for one final display update (N=1). If N is greater than one, then the Prioritized Data Display manager 208 may enable a user (or the PDA device itself) to periodically update the persistent display, in one aspect so that the user does not have to power on the PDA, or unlock a main display (where two displays or display modes are provided) to see current or updated event data (for example, new email, or current or revised weather, stock prices, agenda items, etc.).

Thus, embodiments of the present inventions eliminate the need for item printouts, or for the use of other physical media needed for access to critical data; a single, highest-priority data instance will be available on the display 214 regardless of an absolute failure of power to the PDA (for example, battery drain below operative levels, physical damage, etc.). Providing the persistent display 214 may have lower costs, and have lower weight and size requirements in contrast to other redundant hardware solutions (for example, providing and carrying back-up drives, secondary PDA devices). Embodiments also offer predictability of critical data access.

Versatility in display options may also provide additional power savings, for example by adding an electronic ink Persistent Display Device 214 to a PDA as a secondary display in addition to a primary, more-power intensive backlit display.

In some embodiments, the Prioritized Data Display Manager 208 refreshes and displays the (dynamically ranked) highest item on the Prioritized Data List 206 at all times, while the user uses the primary backlit screen for general PDA processes, so that the priority document is always displayed for use as needed, and thus even if the battery drained or the PDA locks up or otherwise fails to operate. Such a secondary display 214 will generally require a minimal and predictable amount of power to update the image, and this may also be used to set the threshold T to enable the PDA to automatically call up and draw the highest-priority instance on the Prioritized Data List 206 on the display 214 when available power drops below a prescribed level.

By setting the threshold T high enough so that N is greater than one, embodiments of the Prioritized Data Display Manager 208 may monitor battery usage and implement automatic screen display changes, in some examples at intervals specified or configurable by users, manufacturers or service providers. Thus, a user may select multiple, reconfigurable display instances to rotate through the display 214 while ample reserve power remains. The display 214 may also be enabled for use with other, lower-priority instances such as weather, stock quote, or sports score updates while ample reserve power remains, and wherein the manager 208 will automatically switch to and display the most critical/highest priority data instance when available power drops below a prescribed level.

The Prioritized Data Display Manager 208 establishes the rankings on the Prioritized Data List 206 as a function of user inputs. For example, the user may designate that a boarding pass for a flight three days away is the most important/highest priority document, over a lunch appointment address today from a to-do list, setting the appointment image to second on the list 206.

The Prioritized Data List 206 may also be populated from data image instances prioritized in the Service Provider Predefined Image List 106 in response to service provider designations (such as an Information Technology manager for an organization providing the PDA to the user), or to device (factory) defaults. For example, service provider specifications or default settings may use the clock and calendar data 108 to automatically rank today's events (boarding passes for today's flights, today's calendar events, appointments, associated map images with directions, etc.) over events for later days. Furthermore, the 106—Service Provider Predefined Image List may be further revised to reflect the geo-location data 110 associated with each of the instances and a current, determined location of the PDA. Thus, in some examples, items prioritized through proximity to a current time and date are further reprioritized as a function of geographic location.

Accordingly, in one example, the top priority item may be both associated with the current day and have an associated geo-location address most proximate to a current location of the PDA: here, a first data instance having less proximate appointment time on a current day is pushed up and ranked ahead of (higher priority) another, second instance with a more proximate appointment time during the same, current day, in response to determining that an address associated with the first instance is more proximate to a current location of the PDA than an address of the second instance. Such re-rankings may occur automatically, dynamically and responsively to real-time location and time determinations, while the carrier of the PDA traverse time and geo-location distances, without any need of intervention or input from the user carrying the PDA.

A user-designated list 104 or list 106 generated by service provider specifications or default settings may also be populated in response to one or more prioritized data categories, such as important contact information, or owner identity and contact information, which may be particularly useful if the device is lost and the battery drains before someone finds the device so that the primary backlit screen is not available for display of such information.

The Prioritized Data Manager 204 may also dynamically populate the Prioritized Data List 206 through a combination of the Service Provider Predefined Image List 106 and the User-designated list 104, and further as a function of the clock and calendar data 108 and the geo-location data 110. For example, the Service Provider Predefined Image List 106 may provide a default list, which can be overridden by user input through the user-designated list 104. The user may also instruct that the Prioritized Data Manager 204 automatically push certain data categories (such as boarding passes) to the top of the list 206 over a default bias to a more proximate in time or geographic proximity appointment data image. Moreover, by choosing N (or settings to generate N) as greater than one, the present embodiment enables the PDA to display multiple data images from the Prioritized Data List 206 while still preventing other higher power consumption uses of the device (for example, web browsing, making calls) when the level of available battery power drops below a prescribed level.

Embodiments may also store or mirror the Prioritized Data List 206 instance images in a remote server location (for example, on a cloud server, enterprise entity server or other external device accessible via network communications), and display (at 118 or 120 of FIG. 1) a reference link to the location of the Prioritized Data List 206 instance images the remote server when available power drops below a prescribed level (at 116, FIG. 1). For example, the Prioritized Data manager 204 may create a reference to a group of files and encode the reference in a Quick Response Code (QR) that is displayed on the persistent display 214, which may be read by automated QR readers to recognize encoded hyperlink references to remote server resources.

QR code and other reference links may contain authentication information, as well as information about which files are present in the view, in some examples requiring verification of access through the use of password, facial recognition or other security procedures. They may also refer to a specific version of a group of files, and may be regenerated whenever the files change. The references may also be time-limited (for example, valid for a time period up to and including a planned meeting time, then expiring afterward). The references may also be use-limited, for example only valid for a set number of presentations specified by a license agreement.

Thus, embodiments of the present invention provide processes and devices that select a tableau of critical information (or references thereto) to be transferred to a non-volatile display on a portable electronic device. A user may tag and prioritize the specific text or graphics to be displayed as a function of remaining power level and/or user input (e.g., volume controls). Content may be dynamically assigned and prioritized based on its relative importance, geo-location, and date and time attributes (for example, a boarding pass may be automatically selected and displayed on the day of travel or if the determined geo-location of the device is at the appropriate airport. The highest-priority tableau may be displayed when the device predicts its own imminent demise, such as from a depleted battery, and automatic shutdown of the device to a low-power state may occur so as to leave sufficient power to display all of the necessary tableaus (where N>1).

Figure 3:
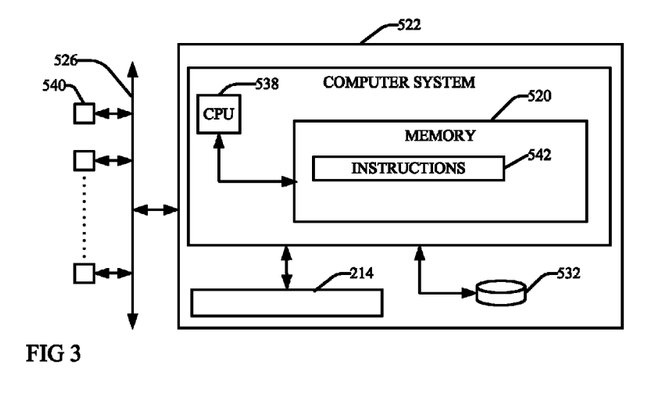
FIG. 3 is a block diagram illustration of a computerized implementation of an embodiment of the present invention.

Referring now to FIG. 3, an exemplary computerized implementation of an embodiment of the present invention includes a portable, programmable device 522 in communication with network data sources 540. Instructions 542 reside within computer readable code in a computer readable memory 532 or other tangible computer readable storage medium that is accessed through a computer network infrastructure 526 by a processing unit (CPU) 538. Thus, the instructions, when implemented by the processing unit (CPU) 538 via a memory 520, cause the processing unit (CPU) 538 to display one or more items from a prioritized list of data items on the persistent display 214 in response to a low-power determination, as discussed above with respect to FIGS. 1 and 2.

Embodiments of the present invention may also perform process steps of the invention on a subscription, advertising, and/or fee basis. That is, a service provider could offer to integrate computer-readable program code into the programmable device 522 to enable the device 522 to display one or more items from a prioritized list of data items on the persistent display 214 in response to a low-power determination as discussed above with respect to FIGS. 1 and 2. The service provider can create, maintain, and support, etc., a computer infrastructure such as the programmable device 522, network environment 526, or parts thereof, that perform the process steps of the invention for one or more customers. In return, the service provider can receive payment from the customer(s) under a subscription and/or fee agreement and/or the service provider can receive payment from the sale of advertising content to one or more third parties. Services may comprise one or more of: (1) installing program code on a computing device, such as the device 522, from a tangible computer-readable medium device 532; (2) adding one or more computing devices to a computer infrastructure; and (3) incorporating and/or modifying one or more existing systems of the computer infrastructure to enable the computer infrastructure to perform the process steps of the invention.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for displaying a prioritized item on a persistent display in response to a low-power determination, the method comprising:
   a processing unit of a programmable personal digital assistant device populating a prioritized data list comprising a plurality of screen image instances listed in an order prioritized as a function of inputs from a user list of items, clock data associated with the user list of items, and calendar data associated with the user list of items;
   the processing unit querying a power subsystem of the personal digital assistant device to determine a level of battery power currently available for operating processes of the personal digital assistant device;
   the processing unit determining a number of screen display changes effectible on a persistent display device in communication with the personal digital assistant device by the processing unit at the determined level of available battery power;
   the processing unit comparing the determined number of screen display changes effectible on the persistent display device by the processing unit at the determined level of available battery power to a specified minimum threshold number of images; and
   in response to a determination that the determined number of screen display changes effectible on the persistent display device at the determined level of available battery power is not more than the specified minimum threshold number of images; the processing unit powering down a subsystem of the personal digital assistant device to conserve battery power, and automatically causing a highest prioritized image of the populated prioritized data list to be displayed on the persistent display device; and
   wherein the persistent display device is a non-volatile electronic ink display that, after a loss of power to the persistent display device, relies on reflected light to continue to persistently display the highest prioritized image or a currently displayed image that is displayed on the persistent display device.

2. The method of claim 1, further comprising:
   in response to a determination that the determined number of screen display changes effectible on the persistent display device at the determined level of available battery power is greater than one, the processing unit iteratively displaying additional, next prioritized images from the prioritized data list on the persistent display device in response to each of at least one user screen display request input until a total number of images equal to the determined number of screen display changes effectible on the persistent display device at the determined level of available battery power has been displayed.

3. The method of claim 2, further comprising:
   in response to a determination that the determined number of screen display changes effectible on the persistent display device by the processing unit at the determined level of available battery power is greater than the specified minimum threshold number of images, the processing unit looping back to iteratively repeat the steps of populating the prioritized data list as a function of the user list and associated clock data and calendar data inputs, querying the power subsystem to determine the current level of available battery power, determining the number of screen display changes effectible on the persistent display device at the determined level of available battery power, and comparing the determined number of screen display changes effectible on the persistent display device at the determined level of available battery power to the specified minimum threshold number of images, until the determined number of screen display changes effectible on the persistent display device at the determined level of available battery power is not more than the specified minimum threshold number of images.

4. The method of claim 3, wherein the at least one user screen display request input is a toggle input of a volume rocker of the personal digital assistant device.

5. The method of claim 3, wherein the step of determining the number of screen display changes effectible on the persistent display device in communication with the personal digital assistant device by the processing unit at the determined level of available battery power comprises:
   determining a series of battery power values for the personal digital assistant device that are each associated with each of a plurality of different clock inputs; and
   comparing differences between the determined battery power values as a function of times of acquisition of each value to specified power delta changes over time to calculate a number of display changes effectible on the persistent display device at the determined level of available battery power.

6. The method of claim 3, wherein the step of populating the prioritized data list further comprises:
   prioritizing a first image instance of the plurality of screen image instances as the highest prioritized image as a function of determining that the calendar date data associated with the first image is a current calendar date, and that geo-location data associated with the first image is more proximate to a current geo-location of the personal digital assistant device than geo-location data associated with a second of the image instances that is associated with the current calendar date and is also associated with a time of day that is more proximate to a current time of day than a time of day associated with the first instance.

7. The method of claim 3, further comprising:
   associating the determined number of screen display changes effectible on the persistent display device at the determined level of available battery power with a predetermined threshold percentage of a total power capacity of a fully-charged state of a battery that is supplying the battery power currently available for operating processes of the personal digital assistant device;
   monitoring a battery assessment process performed by the personal digital assistant device for a reported available percentage of the total power capacity of the fully-charged state of the battery; and
   in response to a determination that the reported available percentage of the total power capacity of the fully-charged state of the battery is less than the pre-determined threshold available percentage, the processing unit powering down the subsystem of the personal digital assistant device to conserve battery power, and automatically causing the highest prioritized image of the populated prioritized data list to be displayed on the persistent display device.

8. The method of claim 3, wherein the persistent display device is an electronic ink display.

9. The method of claim 3, further comprising:
integrating computer-readable program code into a computer readable hardware storage device of the personal digital assistant device in communication with the processing unit, wherein the computer readable program code is embodied on the computer readable hardware storage device and comprises instructions that, when executed by the processing unit via a computer readable memory of the personal digital assistant device, cause the processing unit to perform the steps of populating the prioritized data list of screen image instances listed in the prioritized order, querying the power subsystem to determine the level of battery power currently available for operating processes of the personal digital assistant device, determining the number of screen display changes effectible on the persistent display device by the processing unit at the determined level of available battery power, comparing the determined number of screen display changes effectible on the persistent display device by the processing unit at the determined level of available battery power to the specified minimum threshold number of images, powering down the subsystem of the personal digital assistant device to conserve battery power, and automatically causing the highest prioritized image of the populated prioritized data list to be displayed on the persistent display device.

10. The method of claim 3, further comprising:
storing the plurality of prioritized data list instance images comprising the highest prioritized image in a remote server location;
and wherein the step of automatically causing the highest prioritized image of the populated prioritized data list to be displayed on the persistent display device comprises displaying the reference link to the location of the highest prioritized image stored in the remote server location.

11. The method of claim 10, wherein the reference link is a Quick Response Code (QR).

12. A personal digital assistant device system, comprising:
a processing unit in communication with a computer readable memory, a computer-readable hardware storage device and a persistent display device;
wherein the processing unit, when executing program instructions stored on the computer-readable hardware storage device via the computer readable memory:
populates a prioritized data list comprising a plurality of screen image instances listed in an order prioritized as a function of inputs from a user list of items, clock data associated with the user list of items, and calendar data associated with the user list of items;
queries a power subsystem of the personal digital assistant device to determine a level of battery power currently available for operating processes of the personal digital assistant device;
determines a number of screen display changes effectible on the persistent display device by the processing unit at the determined level of available battery power;
compares the determined number of screen display changes effectible on the persistent display device by the processing unit at the determined level of available battery power to a specified minimum threshold number of images; and
in response to a determination that the determined number of screen display changes effectible on the persistent display device at the determined level of available battery power is not more than the specified minimum threshold number of images, powers down a subsystem of the personal digital assistant device to conserve battery power, and automatically causes a highest prioritized image of the populated prioritized data list to be displayed on the persistent display device; and
wherein the persistent display device is a non-volatile electronic ink display that, after a loss of power to the persistent display device, relies on reflected light to continue to persistently display the highest prioritized image or a currently displayed image that is displayed on the persistent display device.

13. The system of claim 12, wherein the processing unit, when executing the program instructions stored on the computer-readable hardware storage device via the computer readable memory, further, in response to a determination that the determined number of screen display changes effectible on the persistent display device at the determined level of available battery power is greater than one, iteratively displays additional, next prioritized images from the prioritized data list on the persistent display device in response to each of at least one user screen display request input until a total number of images equal to the determined number of screen display changes effectible on the persistent display device at the determined level of available battery power has been displayed.

14. The system of claim 13, wherein the processing unit, when executing the program instructions stored on the computer-readable hardware storage device via the computer readable memory, further, in response to a determination that the determined number of screen display changes effectible on the persistent display device by the processing unit at the determined level of available battery power is greater than the specified minimum threshold number of images, loops back to iteratively and repetitively populate the prioritized data list as the function of the user list and associated clock data and calendar data inputs, query the power subsystem to determine the current level of available battery power, determine the number of screen display changes effectible on the persistent display device at the determined level of available battery power, and compare the determined number of screen display changes effectible on the persistent display device at the determined level of available battery power to the specified minimum threshold number of images, until the determined number of screen display changes effectible on the persistent display device at the determined level of available battery power is not more than the specified minimum threshold number of images.

15. The system of claim 14, further comprising:
a volume rocker that provides the at least one user screen display request input in response to a toggle input by the user.

16. The system of claim 14, wherein the processing unit, when executing the program instructions stored on the computer-readable hardware storage device via the computer readable memory, further prioritizes a first image instance of the plurality of screen image instances as the highest prioritized image as a function of determining that the calendar date data associated with the first image is a current calendar date, and that geo-location data associated with the first image is more proximate to a current geo-location of the personal digital assistant device than geo-location data associated with a second of the image instances that is associated with the current calendar date and is also associated with a time of day that is more proximate to a current time of day than a time of day associated with the first instance.

17. An article of manufacture, comprising:
a computer readable hardware storage device having computer readable program code embodied therewith, the computer readable program code comprising instructions that, when executed by a computer processing unit, cause the computer processing unit to:

populate a prioritized data list comprising a plurality of screen image instances listed in an order prioritized as a function of inputs from a user list of items, clock data associated with the user list of items, and calendar data associated with the user list of items;

query a power subsystem of a personal digital assistant device to determine a level of battery power currently available for operating processes of the personal digital assistant device;

determine a number of screen display changes effectible on a persistent display device in communication with the personal digital assistant device by the processing unit at the determined level of available battery power;

compare the determined number of screen display changes effectible on the persistent display device by the processing unit at the determined level of available battery power to a specified minimum threshold number of images; and in response to a determination that the determined number of screen display changes effectible on the persistent display device at the determined level of available battery power is not more than the specified minimum threshold number of images; power down a subsystem of the personal digital assistant device to conserve battery power and automatically cause a highest prioritized image of the populated prioritized data list to be displayed on the persistent display device; and wherein the persistent display device is a non-volatile electronic ink display that, after a loss of power to the persistent display device, relies on reflected light to continue to persistently display the highest prioritized image or a currently displayed image that is displayed on the persistent display device.

18. The article of manufacture of claim 17, wherein the computer readable program code instructions, when executed by the computer processing unit, further cause the computer processing unit to, in response to a determination that the determined number of screen display changes effectible on the persistent display device at the determined level of available battery power is greater than one, iteratively display additional, next prioritized images from the prioritized data list on the persistent display device in response to each of at least one user screen display request input until a total number of images equal to the determined number of screen display changes effectible on the persistent display device at the determined level of available battery power has been displayed.

19. The article of manufacture of claim 18, wherein the computer readable program code instructions, when executed by the computer processing unit, further cause the computer processing unit to, in response to a determination that the determined number of screen display changes effectible on the persistent display device by the processing unit at the determined level of available battery power is greater than the specified minimum threshold number of images, loop back to iteratively and repetitively populate the prioritized data list as the function of the user list and associated clock data and calendar data inputs, query the power subsystem to determine the current level of available battery power, determine the number of screen display changes effectible on the persistent display device at the determined level of available battery power, and compare the determined number of screen display changes effectible on the persistent display device at the determined level of available battery power to the specified minimum threshold number of images, until the determined number of screen display changes effectible on the persistent display device at the determined level of available battery power is not more than the specified minimum threshold number of images.

20. The article of manufacture of claim 19, wherein the computer readable program code instructions, when executed by the computer processing unit, further cause the computer processing unit to prioritize a first image instance of the plurality of screen image instances as the highest prioritized image as a function of determining that the calendar date data associated with the first image is a current calendar date, and that geo-location data associated with the first image is more proximate to a current geo-location of the personal digital assistant device than geo-location data associated with a second of the image instances that is associated with the current calendar date and is also associated with a time of day that is more proximate to a current time of day than a time of day associated with the first instance.

* * * * *